United States Patent Office 3,336,271
Patented Aug. 15, 1967

3,336,271
SULFONATION PROCESS
Thomas E. Durocher, Bay City, Mich., assignor to The Dow Chemical Company, Midland, Mich., a corporation of Delaware
No Drawing. Filed Jan. 4, 1965, Ser. No. 423,302
6 Claims. (Cl. 260—79.3)

The present invention relates to an improved process for sulfonating alkenyl aromatic resins, such as for example polystyrene, polyvinyltoluene and copolymers of styrene and vinyltoluene, to provide sulfonated resins soluble in water. By "soluble in water" is meant dispersible in water to provide a visually homogeneous and transparent solution. This definition is inclusive of both sulfonated resins sometimes characterized as being water swellable as well as resins characterized as having full water solubility, i.e., their water solutions are infinitely dilutable.

There are numerous patented inventions directed to the preparation of water dispersible sulfonated alkenyl aromatic resins. As object of some of these inventions is to produce such water dispersible resins with a minimum of sulfone crosslinking. Illustratively, recent inventions in this field are described in U.S. Patents 3,072,618 and 3,133,117.

While good results have been obtained with some of the patented processes, it would be desirable, and it is an object of the invention, to provide a novel sulfonation process whereby sulfonated resins are prepared substantially free of sulfone crosslinking. A particular object is to provide a novel sulfonation process for soluble and lightly crosslinked alkenyl aromatic resins. A still further object is to provide a sulfonation process for the preparation of improved flocculants. These and other objects as will become apparent hereinafter, are accomplished in the present invention.

In accordance with the invention an improved process for sulfonating alkenyl aromatic resins i.e., polymers of an interpolymerized alkenyl aromatic compound, comprises the following steps. The alkenyl aromatic resin to be sulfonated is dispersed, as a finely divided particulate solid, in sulfuric acid sufficiently concentrated that sulfonation does not occur to any significant extent at a temperature below about 60° C. Suitable sulfuric acid is characterized by a specific gravity of at least about 1.81 at 20° C. The amount of alkenyl aromatic resin incorporated in the sulfuric acid will range from a relatively small amount, e.g., as little as about 0.5 percent by weight of the total system up to as much as can be conveniently agitated throughout the reaction. Usually the amount of aromatic resin dispersed in the concentrated sulfuric acid is from about 0.5 up to about 40 percent by weight of the sulfuric acid.

Either before, or after, having formed a dispersion or slurry of the alkenyl aromatic resin in the concentrated sulfuric acid at a temperature below about 60° C. chlorosulfonic acid is incorporated into the dispersion. This initiates sulfonation of the polymer. The amount employed is sufficient to form a water dispersible product. This generally requires sulfonation of at least about one-half of the mers constituting the polymer.

In polymers polymerized solely from aromatic monomers, the degree of sulfonation, i.e., average number of sulfonic groups per aromatic moiety, should be at least about 0.5. Normally the degree of sulfonic substitution will not exceed about 2. Preferably, it does not exceed about 1.2.

Although heating of the reaction system to increase the rate of reaction is permissible, it is not necessary since contacting of the chlorosulfonic acid with the alkenyl aromatic resin slurry at normal room temperatures achieves rapid sulfonation of the resin. Preferably, the sulfonation reaction is carried out at a temperature within the range from about 5° C. up to about 60° C. The reaction system should be given vigorous agitation during at least the early stages of the reaction to achieve uniform distribution of the chlorosulfonic acid throughout the resin slurry.

The time required for the reaction can vary from a few minutes, when using higher concentrations of chlorosulfonic acid, up to as much as 10 hours or more when using stoichiometric amounts of chlorosulfonic acid. To achieve efficient utilization of the reactants in the usual case, as little chlorosulfonic acid is added as will provide a desirable rate of reaction and the time of reaction is extended to achieve effectively complete utilization of the sulfonating reagent. The extent of reaction can be roughly determined by sampling the reaction system and evaluating the water solubility of the reaction product.

The parameters of reagent concentrations and reaction times are interrelated, and as will be apparent to those skilled in the art, increases in one, permit decreases in the other to achieve a given sulfonation result. Good results are achieved by employing from as little as about 1 mole up to as much as 15 moles of chlorosulfonic per mole of aromatic mers present in the starting alkenyl aromatic resin and conducting the reaction for a period of time adequate to ensure a water dispersible product.

During the early stages of the sulfonation reaction, the polymer appears as a suspended phase in the concentrated sulfuric acid. As the reaction proceeds, the polymer swells and the system becomes visually homogeneous. The reaction will effectively terminate itself as the chlorosulfonic acid is used up, or if earlier termination is desired, as would be the case when chlorosulfonic acid is used in excess of that necessary to give the desired degree of sulfonation, it may be terminated simply by separating and recovering the sulfonated product from the reaction system. This can be accomplished by centrifugation of the reaction mass and decanting the supernatant liquid. Alternately, the reaction can be terminated and the suspended polymer aggregated by diluting the reaction system with water using extreme caution not to add the water too rapidly. Once the polymer has been aggregated, decantation or siphoning of the remaining liquid phase from the system is possible.

After separation from the reaction system, the sulfonated polymer is washed with additional water until it begins to swell and adsorb water. After one or two washings, it will have adsorbed enough water that substantial losses may occur by dissolution if washing is continued. If further purification is desired at this point, the polymer can be neutralized with an alkali metal hydroxide and dissolved in water and the resulting solution dialyzed.

Ultimately the washed or dialyzed polymer is dried to recover a finely divided water-dispersible, solid polyvinylaromatic sulfonic acid or neutralization salt thereof.

Sulfonation products of linear polymers containing polymerized alkenyl aromatic groups thus prepared, depending on the extent of sulfonation, are at least water dispersible or completely water soluble if the sulfonation reaction is carried out to a sufficient degree. Such polymers are characterized by a minimum of sulfone crosslinking. If a water thickener is desired, a highly effective water swellable, viscosity stable resin can be provided by sulfonating such a resin to a degree within the range of about 0.5 to about 0.7. If a water soluble flocculant is desired as an end product, such can be obtained by sulfonating a linear alkenyl aromatic resin to a degree of sulfonation above about 0.8. Crosslinked polymers of alkenyl aromatics can also be sulfonated in accordance with the invention.

Alkenyl aromatic resins useful as starting materials in the invention include those described in U.S. Patent 2,763,634. Preferably the starting polymer has a molecular weight in excess of 100,000. As the molecular weight of the starting polymer is increased so are the advantages of the invention.

In addition to the polymers of monoethylenically unsaturated monomers described in the mentioned patent, copolymers of such monomers with small amounts of polyfunctional monomers can also be used in the present invention. Such copolymers may contain up to as much as 5 percent by weight based on the weight of the monofunctional monomer, of a polyfunctional, crosslinking monomer such as divinylbenzene, divinyl ethers and the like.

The following examples illustrate the invention.

*Example I*

Twenty-five grams of a polyvinyltoluene were slurried in 800 cc.'s of concentrated sulfuric acid having a specific gravity of about 1.84 at 20° C. in a 2 liter, 3 neck flask equipped with stirrer, calcium chloride drying tube and dropping funnel. The slurry thus prepared was stirred vigorously for 30 minutes after which 80 cc.'s of chlorosulfonic was added at room temperature over a one hour period. The reaction charge was stirred slowly for about 30 hours at which time the system had become visually homogenous and amber in color. 210 grams of water was then slowly added to the mixture. This resulted in the separation of the reaction system into two phases. The supernatant layer containing the aggregated, sulfonated polymer was recovered and dissolved in one liter of water to provide a homogeneous solution without gels which evidence sulfone crosslinking. The solution was dialyzed and neutralized to a pH of 7 by the addition of sodium hydroxide. The neutral solution was dried at a moderate elevated temperature under reduced pressure to recover a solid, particulate sodium polyvinyltoluene sulfonate.

For the purposes of comparison, a second sulfonation reaction was carried out in a manner identical to that employed above beginning with the same polyvinyltoluene except that 55 grams of sulfur trioxide was substituted for the chlorosulfonic acid. The resulting sulfonated product, like that prepared above, was also readily dispersed in water without evidence of cross-linking. However, as shown below, this product was substantially inferior as a flocculant.

To demonstrate superior usefulness of polymers prepared under the invention, flocculation tests were carried out in which 10 grams of bentonite clay and 12 milliliters of 5 normal sodium hydroxide were placed in a 100 milliliter graduated cylinder. Enough water was added to the cylinder to make up a suspension having a total volume of 100 milliliters. After shaking the graduate to form a uniform suspension of the clay, the suspension was treated with 5 milliliters of a 0.025 percent by weight aqueous solution of the polymer. The graduate was revolved three times and returned to the upright position. The time (flocculation rate) for the suspension to settle from the 90 milliliter mark to the 60 milliliter mark was determined.

The flocculation rates according to the above test procedure using the polymer sulfonated with chlorosulfonic acid in a sulfuric acid reaction medium and for a second test in which 10 milliliters of the same polymer solution was used, were 110 and 36 seconds respectively.

In like flocculation tests with the second of the above prepared polymer sulfonates very litle flocculation activity was observed. At a dosage level of 15 milliliters of a 0.025 percent by weight solution of this polymer, the flocculation rate was 316 seconds.

*Example II*

This example illustrates the applicability of the invention to the sulfonation of a lightly crosslinked alkenyl aromatic resin, particularly a lightly crosslinked polyvinyltoluene obtained by copolymerizing vinyl toluene with 0.05 percent by weight of divinyl benzene, based on the weight of vinyl toluene. The organic monomers were emulsified in water and polymerized with a chemical free radical catalyst at 30° C. for 12 hours. The resulting polymer latex as coagulated, recovered from the reaction system and dried to provide a free flowing white powder.

Twenty-five grams of the lightly crosslinked polyvinyltoluene were suspended in a 100 milliliters of concentrated sulfuric acid at room temperature. The acid had a specific gravity of 1.84 at 20° C. The polyvinyltoluene became slightly swollen but sulfonation was at a minimum After agitating this slurry for about 30 minutes, 80 grams of chlorosulfonic acid was added and the rate of agitation reduced. The sulfonation reaction proceeded rapidly at this point as evidenced by the swelling of the polymer particles. This mixture was stirred for 30 hours at room temperature. One hundred milliliters of water was then added to the flask. This caused the aggregation of the polymer. The aggregated polymer was separated from the reaction system and washed with water. It was then dispersed in one liter of water and the resulting visually homogenous solution dialyzed. Sulfur analysis on the purified product indicated a degree of sulfonation of 85 percent, assuming monosulfonation of each aromatic moiety. This product was readily dispersed in water to form a visually homogenous system.

While the invention is not predicated on an understanding of the mechanism responsible for the superior sulfonation product obtained, it is believed to depend, at least in part, upon the repression of sulfone forming intermediates by the concentrated sulfuric acid reaction medium.

What is claimed is:

1. A method for sulfonating an alkenylaromatic resin which comprises dispersing the resin in concentrated sulfuric acid having a specific gravity of at least 1.81 at 20° C. and incorporating chlorosulfonic acid into the dispersion which is at a temperature less than about 60° C., in amount sufficient to sulfonate the resin whereby a water dispersible alkenylaromatic resin sulfonate is obtained.

2. A method as in claim 1 wherein the resin is a polyvinyltoluene having a molecular weight in excess of 100,000.

3. A method as in claim 1 wherein the amount of resin sulfonated is within the range of 0.5 percent up to 40 percent by weight of the acid.

4. A method as in claim 1 wherein the resin is a polyalkenylaromatic and amount of chlorosulfonic acid used is sufficient to sulfonate the resin to a degree of at least 0.5.

5. A method as in claim 1 and including the additional step of separating the alkenylaromatic resin from the reaction system.

6. A method for sulfonating polyvinyltoluene having a molecular weight in excess of 100,000 which comprises dispersing the polyvinyltoluene in sulfuric acid having a specific gravity of at least 1.81 at 20° C. and incorporating chlorosulfonic acid into the dispersion, which is at a temperature less than about 60° C., in an amount and for a period of time sufficient to sulfonate the polyvinyltoluene to a degree of at least about 0.5.

References Cited

UNITED STATES PATENTS

| | | | |
|---|---|---|---|
| 2,809,960 | 10/1952 | Roth | 260—79.3 |
| 3,033,824 | 5/1962 | Roth | 260—79.3 |
| 3,158,583 | 11/1964 | Corte | 260—79.3 |
| 3,252,921 | 5/1966 | Hansen et al. | 260—79.3 |

JOSEPH L. SCHOFER, *Primary Examiner.*

D. K. DENENBERG, *Assistant Examiner.*